United States Patent [19]

Lowery et al.

[11] Patent Number: 4,929,336
[45] Date of Patent: May 29, 1990

[54] TREATMENT OF SPENT CRACKING CATALYSTS

[75] Inventors: Richard E. Lowery, Tulsa; Chia M. Fu, Bartlesville; Michael K. Maholland, Bartlesville, all of Okla.

[73] Assignee: Phillips Petroleum Company, Bartlesville, Okla.

[21] Appl. No.: 420,790

[22] Filed: Oct. 12, 1989

[51] Int. Cl.⁵ ............................................. C10G 11/05
[52] U.S. Cl. ................... 208/120; 208/52 CT; 208/121; 502/26; 502/27; 502/516
[58] Field of Search .............. 502/26, 27, 35.36, 516; 208/52 CT, 113, 120, 115, 121

[56] References Cited

U.S. PATENT DOCUMENTS

| 4,107,031 | 8/1978 | Ward | 502/26 |
| 4,190,553 | 2/1980 | Ward | 502/26 |
| 4,500,422 | 2/1985 | Miale et al. | 208/117 |
| 4,559,131 | 12/1985 | Miale | 208/111 |
| 4,794,095 | 12/1988 | Walker et al. | 502/79 |
| 4,800,185 | 1/1989 | Elvin | 208/52 CT |
| 4,814,066 | 3/1989 | Fu | 208/120 |
| 4,871,702 | 10/1989 | Chang et al. | 502/26 |

FOREIGN PATENT DOCUMENTS

| A10295020 | 12/1988 | European Pat. Off. | 502/77 |
| 1080444 | 3/1988 | Japan | 502/26 |

*Primary Examiner*—Anthony McFarlane
*Attorney, Agent, or Firm*—K. K. Brandes

[57] ABSTRACT

A process for reactivating a spent, metal-contaminated zeolite-containing catalytic cracking catalyst composition comprises contacting the spent catalyst composition with an acidified aqueous $NH_4NO_3$ solution, thereafter with a suitable fluorine compound (preferably dissolved $NH_4F$), and, optionally, additionally with an antimony compound. The thus prepared reactivated cracking catalyst composition is used in a process for catalytically cracking a liquid hydrocarbon-containing feed.

34 Claims, No Drawings

TREATMENT OF SPENT CRACKING CATALYSTS

BACKGROUND OF THE INVENTION

This invention relates to a method of reactivating spent zeolite-containing catalytic cracking catalysts and of passivating metal deposits thereon by sequential treatment with suitable compounds. In another aspect, this invention relates to a catalytic cracking process employing a reactivated spent cracking catalyst.

Methods of rejuvenating deactivated zeolite-containing cracking catalysts by treatment with ammonium compounds and fluorine compounds are known and have been disclosed in the patent literature, e.g., in U.S. Pat. Nos. 4,814,066, 4,559,131 and 4,500,422. However, there is an ever present need to develop new, more effective catalyst reactivation processes.

SUMMARY OF THE INVENTION

It is an object of this invention to provide a multi-step process for treating a spent, metal-contaminated zeolite-containing cracking catalyst composition under such conditions as to enhance its catalytic cracking activity and to reduce its capability of generating hydrogen during catalytic cracking. It is another object of this invention to provide a reactivated cracking catalyst composition. It is a further object of this invention to provide a catalytic cracking process employing a reactivated spent cracking catalyst composition. A particular object of this invention is to provide an improvement of the processes of U.S. Pat. No. 4,814,066, the entire disclosure of which is herein incorporated by reference. Other objects and advantages will become apparent from the detailed description of the invention and the appended claims.

According to this invention, in a process for reactivating a spent cracking catalyst composition comprising the steps of;

(a) contacting a spent zeolite-containing catalytic cracking catalyst composition, which contains at least one metal contaminant and at least a portion of which has previously been used in a catalytic cracking process (and has thereby lost some of its initial catalytic cracking activity, i.e., its activity before its use in the catalytic cracking process), with an aqueous solution of ammonium nitrate, under such conditions as to enhance the catalytic cracking activity of said spent catalyst composition;

(b) at least partially (preferably substantially) separating the catalyst composition having enhanced catalytic cracking activity obtained in step (a) from said solution used in step (a); and (c) contacting the at least partially separated cracking catalyst composition having undergone steps (a) and (b) with at least one fluorine compound selected from the group consisting of $NH_4F$, $NH_4HF_2$ and $HF$, under such conditions as to enhance the catalytic cracking activity of the catalyst composition having undergone steps (a) and (b);

the improvement comprises carrying out step (a) with an acidified ammonium nitrate solution having a pH in the range of from about 0 to about 5.

In a preferred embodiment, the reactivation process of this invention comprises the additional step of (d) treating the reactivated catalyst composition obtained in step (c) with at least one compound of antimony, under such conditions as to reduce the detrimental effect of said at least one metal contaminant [contained in said material obtained in step (c)] during catalytic cracking, as measured by hydrogen generation in a test for catalytically cracking a heavy hydrocarbon-containing oil, carried out substantially in accordance with the procedure of Example 11 of U.S. Pat. No. 4,794,095, the disclosure of which is herein incorporated by reference.

Also in accordance with this invention, there is provided a reactivated spent catalytic cracking catalyst composition having undergone steps (a) through (c), and preferably also step (d), as defined above.

Further in accordance with this invention, a catalytic cracking process is provided comprising the step of contacting a hydrocarbon-containing feed stream with a zeolite-containing cracking catalyst composition, under such catalytic cracking conditions as to obtain at least one normally liquid (i.e., liquid at 25° and 1 atm.) hydrocarbon containing product stream having a lower initial boiling point and higher API gravity than said hydrocarbon-containing feed stream, wherein at least a portion of said zeolite-containing cracking catalyst composition is a reactivated spent catalyst composition having undergone steps (a) through (c), and preferably also step (d), as defined above.

DETAILED DESCRIPTION OF THE INVENTION

The term "catalytic cracking", as used herein, implies that essentially no hydrocracking occurs and that the catalytic cracking process is carried out with a hydrocarbon-containing oil substantially in the absence of added hydrogen gas. The term "spent", as used herein, implies that at least a portion of the zeolite-containing catalyst composition employed in step (a) has been used in a process for catalytically cracking hydrocarbon-containing oils, in particular those containing metal (Ni, V, Cu) impurities, and has then been regenerated by stripping of adhered oil from the catalyst (such as by steam-stripping) and subsequent heating in an oxidizing gas atmosphere (such as air) so as to burn off coke deposits on the catalyst composition.

Any spent zeolite-containing catalyst composition, which contains at least one metal contaminant and at least a portion of which has previously been used in a catalytic cracking process, can be used as starting material in step (a) of the process of this invention. The spent catalyst composition can contain any portion of such regenerated catalyst composition, ranging from 100% to about 10 weight-% (i.e., containing 0% to about 90 weight-% fresh, unused zeolite-containing cracking catalyst composition). The term "spent catalyst composition" encompasses equilibrium cracking catalysts, which are commonly employed in commercial cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing cracking composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621, the disclosure of which is herein incorporated by reference. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749, the disclosure of which is herein incorporated by reference.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 $m^2/g$. Generally, the weight ratio of zeolite to matrix material in the spent cracking catalyst composition is in the range of from about 1:20 to about 1:1.

The spent zeolite-containing cracking catalyst composition employed in step (a) of the process of the invention contains metal compounds as contaminants (generally as oxides), such as compounds (particularly oxides) of Ni, V, Fe, and Cu, and the like. Contaminants of each metal can be present in amounts ranging from traces (about 0.01 weight-%) to about 2.0 weight-% of each contaminant metal, expressed as metal oxide. These impurities in the spent cracking catalyst compositions have generally been absorbed from the oil feed in a previous cracking process. However, the origin of these metal impurities is not believed to be a critical feature of this invention. It is within the scope of this invention to use spent cracking catalysts from which at least a portion of contaminant metals (Ni, V, Cu) have been removed (e.g., by leaching with a suitable agent).

The pH of the acidified aqueous ammonium nitrate solution used in step (a) is in the range of about 0 to about 5 can be employed, preferably a pH of about 1-3, more preferably about 1-2. Any suitable acid can be added to an aqueous ammonium nitrate solution, such as HCl, HNO$_3$ (presently preferred), H$_2$SO$_4$, and the like, to attain the above-cited pH values.

Any suitable concentration of ammonium nitrate in the acidified solution used in step (a) can be employed. Generally the concentration of ammonium nitrate is in the range of from about 0.01 to about 5 mol/l, preferably from about 0.1 to about 2 mol/l. Any suitable ratio of solution to spent zeolite-containing catalyst composition can be employed in step (a). Generally, the ratio of number of grams of spent catalyst composition to number of liters of solution is in the range of about 1:1 to about 1000:1, preferably from about 10:1 to about 100:1. Generally, the ratio of the number of grams of spent catalyst to the number of moles of dissolved ammonium nitrate in step (a) is in the range of from about 1:1 to about 1000:1, preferably from about 10:1 to about 100:1.

The contacting of the spent zeolite-containing catalyst composition and the acidified solution of the ammonium compound in step (a) can be carried out in any suitable manner. It can be done as a batch process in a vessel, preferably with agitation. Or it can be done continuously, such as by passing the acidified solution of ammonium nitrate through a column filled with a spent catalyst composition. Any suitable time of contact between solution and spent catalyst composition can be employed, generally from about 0.5 to about 5 hours (preferably about 5-30 minutes). Any suitable temperature can be employed in step (a), generally from about 10° C to about 100° C (preferably about 60°-90° C), generally at ambient pressure (1 atm).

Any suitable means for at least partially (preferably substantially) separating the spent catalyst composition which has been treated in step (a) from the solution used in step (a) can be employed in step (b). Non-limiting examples of suitable solid/liquid separation means are filtration, centrifugation, settling and subsequent draining or decantation of the liquid, and the like.

Preferably, the at least partially separated catalyst composition obtained in step (b) is dried, so as to substantially remove adhered water therefrom. Preferred drying conditions comprise a temperature of about 80°-120° C, at atmospheric pressure conditions, and a drying time of about 0.5-10 hours.

Optionally, the at least partially separated catalyst composition is washed with a suitable liquid (preferably water) after: the separation step (b) and before the above-described drying step (b1). Generally, the temperature of the wash liquid (preferably water) is about 100°-212° F, preferably about 180°-210° F.

Contacting step (c) can be carried out with NH$_4$F (preferred), NH$_4$HF$_2$, HF, or mixtures of two or three of these compounds. Preferably, the fluorine compound employed in siep (c) is dissolved in a suitable solvent (more preferably water, less preferably an aliphatic alcohol having from 1-8 carbon atoms per molecule).

In a preferred embodiment, a solution of the fluorine compound (more preferably NH$_4$F) in water having a concentration of about 0.3-2 mol/l (more preferably about 0.8-1.2 mol/l) of the fluorine compound is employed in step (c). Preferably, the ratio of number of millimoles of the fluorine compound to the number of grams of the at least partially separated (and preferably dried) NH$_4$-exchanged catalyst composition having undergone steps (a) and (b) is in the range of from about 0.01:1 to about 10:1, more preferably from about 0.2:1 to about 1:1. When a solution of the fluorine compound is employed, the ratio of the number of cubic centimeters of solution to the number of grams of at least partially separated (and preferably dried) NH$_4$-exchanged catalyst composition is in the range from about 0.04:1 to about 5:1, preferably from about 0.2:1 to about 1:1.

Any suitable temperature, contact time, and other contacting parameters can be employed in step (c). Preferred temperature/time/pressure conditions in step (c) are the same as those employed in step (a). Preferably, step (c) is carried out with agitation, either as a continuous process or as a batch process. Preferably, about 0.01 to about 0.5 weight-% F has been incorporated into the reactivated catalyst composition obtained in step (c), wherein the weight percentage of F is based on the weight of the dry reactivated catalyst composition.

Preferably, the catalyst composition which has undergone treatment steps (a), (b) and (c) is substantially dried in drying step (c1) at a temperature in the range of from about 70° to about 200° C, preferably about 80°-120° C. The heating time of step (c1) generally is in the range of from about 0.1 to about 10 hours (preferably 0.5-3 hours). Pressure conditions can be atmospheric (i.e., about 1 atm) or subatmospheric or superatmospheric. Preferably, this heating step is carried out in an oxidizing gas atmosphere, more preferably in a free oxygen containing gas, such as air. However, an inert gas atmosphere can also be employed. It is within the scope of this invention to carry out an additional calcining step (preferably at about 450°-600° C for about 0.5-5 hours; more preferably in air) after the drying step.

The preferred additional metals passivating step (d) can be carried out in any suitable manner with the material obtained in step (c) or, alternatively, (c1). The term "metals passivating", as used herein, implies that the detrimental effect of generating $H_2$ during catalytic cracking caused by metal deposits (such as Ni, V and Cu) on a cracking catalyst composition has been mitigated. Any suitable metals passivating agents selected from the group consisting of compounds of antimony can be used for contacting the material obtained in step (c) or, alternatively, (c1). Non-limiting examples of such compounds are described in U.S. Pat. Nos. 3,711,422, 4,025,458, 4,190,552, 4,193,891 and 4,263,131. Preferred passivating agents include: antimony tris(0,0-dihydrocarbyl) phosphorodithioates, antimony oxides (more preferably $Sb_2O_5$), antimony carboxylates, antimony mercaptides, and mixtures thereof.

In metals passivating step (d), the material obtained in step (c) or, alternatively, (c1) is contacted (generally impregnated or sprayed) with a solution or, alternatively, a dispersion of at least one antimony compound in a suitable liquid medium (such as water) so as to incorporate into the material obtained in step (c) or, alternatively, (c1) an effective amount of antimony. Any effective concentration of the antimony compound passivating agent in the solution or dispersion can be applied (preferably about 0.01-0.5 mol/l Sb). Any suitable weight ratio of an antimony compound to the material obtained in step (c) or, alternatively, (c1) can be applied in the metals passivating step. Generally, this weight ratio is in the range of from about 0.00001:1 to about 0.5:1, preferably in the range of from about 0.001:1 to about 0.2:1. Generally, step (d), described above, is carried out at any suitable temperature, preferably, at a temperature of about 10 to about 95° C.

Preferably, this metals passivating step is followed by a drying step (d2) (preferably in air or an inert gas such as $N_2$, for about 0.2-10 hours, at a temperature of about 100° to about 150° C). When an organic antimony compound is used, generally the drying step is followed by an additional calcining step (d2) (preferably at a temperature of about 450° to about 750° C, for about 0.2-10 hours, in air or an inert gas such as $N_2$). In the calcining step, generally the applied metals passivating agent is substantially converted to an oxidic form (e.g., $Sb_2O_3$ and/or $Sb_2O_5$.

Any suitable effective total level of antimony in the material obtained in step (d) can be attained. Generally, this level is in the range of from about 0.01 to about 5 weight-% of antimony, expressed as Sb metal, based on the weight of the substantially dry material. Preferably, this level is about 0.01 to about 2 weight-% Sb.

The reactivated catalyst composition obtained in step (c) or, alternatively in step (d) can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition obtained in step (c) or (d) can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F, preferably a boiling range of from about 400° to about 1200° F, more preferably a range of from about 500° to about 1100° F, measured at atmospheric pressure conditions. The API gravity (measured at 60° F) generally is in the range of from about 5 to about 40, preferably from about 10 to about 35. Generally, these feedstocks contain Ramsbottom carbon residue (ASTM D 524; usually about 0.1-20 weight-%), sulfur (generally about 0.1-5 weight-% S), nitrogen (generally about 0.05-2 weight-% N), nickel (generally about 0.05-30 ppm Ni, i.e., parts by weight of Ni per million parts by weight of feed), vanadium (generally about 0.1-50 ppm V) and copper (generally about 0.01-30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used cracking catalyst composition from gaseous and liquid cracked products and the separation of cracking products into various gaseous and liquid product fractions can be carried out by any conventional separation means. The most desirable product fraction is gasoline (ASTM boiling range: about 180°–400° F). Non-limiting examples of such separation schemes are shown in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention comprising steps (a)-(c), preferably (a)-(d), and thereafter be recycled to the catalytic cracking reactor, generally in admixture with fresh (unused) cracking catalyst.

The following examples are present to further illustrate this invention and are not to be considered as unduly limiting the scope of this invention.

EXAMPLE I

This example illustrates methods for reactivating a zeolite-containing equilibrium catalyst, i.e., a catalytic cracking catalyst a portion of which had previously been employed in a catalytic cracking process and had then been regenerated.

Catalyst A (Control) was a GXO-40 equilibrium catalyst, which had been supplied as fresh catalyst by Davison Chemical Division of W. R. Grace and Company, Baltimore, MD, and had previously been employed in a commercial FCC cracking process in a refinery of Phillips Petroleum Company, and had thereafter been regenerated by heating in air. The fresh catalyst contained about 25 weight-% zeolite and about 75 weight-% silica-alumina matrix. Catalyst A contained about 0.18 weight-% Ni, about 0.32 weight-% V, about 0.53 weight-% Fe, about 0.01 weight-% Cu, 0.05–0.15 weight-% Sb and about 0.36 weight-% Na. Catalyst A had a surface area of 110 m$^2$/g, a total pore volume of 0.18 cc/g, and an apparent bulk density of 0.90 g/cc. The zeolite unit cell size was 24.36 Angstroms.

Catalyst B (Control) was prepared by mixing 100 grams of Catalyst A with 400 grams of an aqueous 12.5 molar NH$_4$NO$_3$ solution having a pH of about 6, stirring the mixture at about 200° F for about 5 minutes, separating the NH$_4$NO$_3$-treated catalyst from the solution by filtration and drying the separated catalyst at about 300° F for about 2 hours.

Catalyst C through G (Control) were prepared in accordance with the procedure described for Catalyst B, except that the aqueous ammonium nitrate solution was acidified by addition of HNO$_3$, so as to attain pH values of 5, 4, 3, 2 and 1, respectively.

Catalyst H (Control) was prepared by spraying 50 g of Catalyst B with 235 grams of an aqueous 1.2 molar solution of NH$_4$F in a rotating barrel mixer. Thereafter, the NH$_4$F-treated catalyst was sprayed with 22.5 grams of a mixture of distilled water and 0.25 grams of an aqueous dispersion of Sb$_2$O$_5$ which contained about 20 weight-% Sb (provided by Catalyst Resources, Inc., Pasadena, TX, under the product designation "Phil-AD CA 6000"). The thus treated catalyst was dried at about 120° C for about 16 hours. Catalyst B contained about 5000 ppm F (parts by weight fluoride million parts by weight catalyst) and about 1000 ppm Sb.

Catalysts I through M (Invention) were prepared by treating Catalysts C through G in accordance with the procedure described for Catalyst H. Catalysts I through M also contained 5000 ppm F and 1000 ppm Sb.

Catalyst A through M were then evaluated in a MCBU (micro-confined bed unit) cracking test reactor, substantially in accordance with the procedure of Example II of U.S. Pat. No. 4,794,095. Cracking test conditions comprised a temperature of about 950° F, a catalyst to oil weight ratio of about 6.1:1, and the use of a hydrotreated residuum as oil feed having API gravity at 60° C of 18 7, sulfur content of 0.53 weight-% basic nitrogen content of 0.09 weight-%, Conradson carbon content of 6.7 weight-%, nickel content of 10 6 ppm (parts per million by weight) and vanadium content of 12.7 ppm. Test results are summarized in Table I.

TABLE I

| Catalyst | pH of NH$_4$NO$_3$ Solution | ppm F | ppm Sb | Conversion (Wt.-% of Feed) | Yields (Wt.-% of Converted Feed) | | | H$_2$ Generation (SCF/Bl) |
|---|---|---|---|---|---|---|---|---|
| | | | | | Gasoline | Light Cycle Oil | Heavy Cycle Oil | |
| A | — | 0 | 0 | 75.2 | 49.8 | 16.2 | 8.7 | 398 |
| B | 6 | 0 | 0 | 76.5 | 49.8 | 14.7 | 8.8 | 365 |
| C | 5 | 0 | 0 | 76.4 | 50.4 | 15.0 | 8.6 | 367 |
| D | 4 | 0 | 0 | 76.7 | 50.4 | 15.1 | 8.2 | 356 |
| E | 3 | 0 | 0 | 76.5 | 49.4 | 14.8 | 8.7 | 409 |
| F | 2 | 0 | 0 | 78.1 | 51.3 | 14.2 | 7.7 | 391 |
| G | 1 | 0 | 0 | 78.4 | 51.1 | 14.4 | 7.2 | 376 |
| H | 6 | 5,000 | 1,000 | 78.2 | 52.4 | 14.3 | 7.5 | 211 |
| I | 5 | 5,000 | 1,000 | 80.1 | 53.3 | 13.5 | 6.4 | 230 |
| J | 4 | 5,000 | 1,000 | 79.6 | 52.2 | 13.5 | 7.0 | 235 |
| K | 3 | 5,000 | 1,000 | 80.4 | 52.2 | 12.9 | 6.7 | 263 |
| L | 2 | 5,000 | 1,000 | 81.8 | 54.0 | 12.5 | 5.7 | 221 |
| M | 1 | 5,000 | 1,000 | 81.5 | 52.8 | 12.6 | 6.0 | 245 |

Notes:
(1) H$_2$ Generation is expressed as standard cubic feet of H$_2$ per barrel of converted feed.
(2) Coke yields ranged from about 11 to about 13 weight-% in the above runs.

Test results in Table I clearly show that runs with invention Catalysts I through M exhibited highest feed conversion and lowest yield of undesirable heavy cycle oil. The best results were obtained with Catalysts L and H which had been treated with an aqueous NH$_4$NO$_3$ solution having a pH of about 1 and 2, respectively.

Reasonable variations, modifications and adaptations for various conditions and uses can be made within the scope of the disclosure and appended claims.

That which is claimed is:

1. In a process for reactivating a spent zeolite-containing cracking catalyst composition comprising the steps of
   (a) contacting a spent zeolite-containing catalytic cracking catalyst composition, which contains at least a metal contaminant and at least a portion of which has previously been used in a catalytic cracking process, with an aqueous solution of ammonium nitrate, under such conditions as to enhance the catalytic cracking activity of said spent catalyst composition;
(b) at least partially separating the catalyst composition having enhanced catalytic cracking activity obtained in step (a) from said solution used in step (a); and
(c) contacting the at least partially separated cracking catalyst composition having undergone steps (a) and (b) with at least one fluorine compound selected from the group consisting of $NH_4F$, $NH_4F$, $NH_4HF_2$ and HF, under such conditions as to enhance the catalytic cracking activity of the catalyst composition having undergone steps (a) and (b);

the improvement which comprises carrying out step (a) with an acidified ammonium nitrate solution having a pH in the range of from about 0 to about 5.

2. A process in accordance with claim 1, wherein the pH of said solution used in step (a) is about 1–3.

3. A process in accordance with claim 1, wherein the pH of said solution used in step (a) is about 1–3, and said at least one fluorine compound used in step (c) is $NH_4F$.

4. A process in accordance with claim 3, wherein the pH of said solution used in siep (a) is about 1–2.

5. A process in accordance with claim 1, wherein said at least one metal contaminant contained in said spent cracking catalyst composition in selected from the group consisting of compounds of nickel, vanadium, iron and copper.

6. A process in accordance with claim 1, wherein the concentration of $NH_4NO_3$ in said solution used in step (a) is in the range of from about 0.01 to about 5 mol/l $NH_4NO_3$, and the ratio of the number of grams of spent catalyst composition to the number of moles of dissolved $NH_4NO_3$ in steps (a) is in the range of from about 1:1 to about 1000:1.

7. A process in accordance with claim 1, wherein said at least one fluorine compound used in step (c) is $NH_4F$, $NH_4F$ is dissolved in water, the concentration of $NH_4F$ in the solution is in the range of from about 0.3 to about 2.0 mol/l $NH_4F$, and the ratio of the number of millimoles of $NH_4F$ to the number of grams of said at least partially separated cracking catalyst composition in step (c) is in the range of from about 0.01:1 to about 10:1

8. A process in accordance with claim 1, wherein about 0.01–5 weight percent F has been incorporated into the reactivated catalyst composition obtained in step (c).

9. A process in accordance with claim 1 comprising the additional step of drying the at least partially-separated cracking catalyst composition obtained in step (b), before carrying out step (c).

10. A process in accordance with claim 1 comprising the additional step of washing the at least partially-separated cracking catalyst obtained in step (b) with water at about 100°14 212° F, before carrying out step (c).

11. A process in accordance with claim 1 comprising the additional step of substantially drying said reactivated catalyst composition obtained in step (c).

12. A process in accordance with claim 1 comprising the additional step of
(d) treating the reactivated catalyst composition obtained in step (c) with at least one compound of antimony, under such conditions as to reduce hydrogen generation caused by said at least one metal contaminant during catalytic cracking.

13. A process in accordance with claim 12, wherein step (d) is carried out under such conditions as to incorporate about 0.1 to about 5 weight-% Sb into the reactivated spent catalyst composition obtained in step (d).

14. A process in accordance with claim 12 comprising the additional step of substantially drying the reactivated catalyst composition obtained in step (d).

15. A reactivated catalytic cracking catalyst composition prepared in accordance with the reactivation process of claim 1.

16. A reactivated catalytic cracking catalyst composition in accordance with claim 15 containing about 0.01–5 weight-% F.

17. A reactivated catalytic cracking catalyst composition in accordance with claim 15 containing about 0.01–5 weight-% F. and about 0.1–5 weight-% Sb.

18. A catalytic cracking process comprising the step of contacting a hydrocarbon-containing feed stream with a zeolite-containing catalytic cracking catalyst composition, under such cracking conditions as to obtain at least one normally liquid hydrocarbon-containing product stream having a lower initial boiling point and higher API gravity than said hydrocarbon-containing feed stream;

wherein at least a portion of said cracking catalyst composition is a reactivated spent catalyst composition having undergone a reactivation process comprising the steps of
(a) contacting a spent zeolite-containing catalytic cracking catalyst composition, which contains at least one metal contaminant and at least a portion of which has previously been used in a catalytic cracking process, with an acidified aqueous solution of ammonium nitrate having a pH in the range of from about 0 to about 5, under such contacting conditions as to enhance the catalytic cracking activity of said cracking catalyst composition;
(b) at least partially separating the cracking catalyst composition having enhanced cracking activity obtained in step (a) from said solution used in step (a); and
(c) contacting the at least partially separated cracking catalyst composition having undergone steps (a) and (b) with at least one fluorine compound selected from the group consisting of $NH_4F$, $NH_4HF_2$ and HF, under such conditions as to enhance the catalyst cracking activity of the catalyst composition having undergone steps (a) and (b).

19. A catalytic cracking process in accordance with claim 18, wherein the pH of said solution used in step (a) is about 1–3.

20. A catalytic cracking process in accordance with claim 18, wherein the pH of said solution used in step (a) is about 1–3, and said at least one fluorine compound used in step (c) is $NH_4F$.

21. A catalytic cracking process in accordance with claim 20, wherein the pH of said solution is about 1–2.

22. A catalytic cracking process in accordance with claim 18, wherein said at least one metal contaminant contained in said spent cracking catalyst composition is selected from the group consisting of compounds of nickel, vanadium, iron and copper.

23. A catalytic cracking process in accordance with claim 18, wherein the concentration of $NH_4NO_3$ in said solution used in step (a) is in the range of from about 0.01 to about 5 mol/l $NH_4NO_3$, and the ratio of the number of grams of spent catalyst composition to the number of moles of dissolved $NH_4NO_3$ in steps (a) is in the range of from about 1:1 to about 1000:1.

24. A catalytic cracking process in accordance with claim 18, wherein said at least one fluorine compound used in step (a) is $NH_4F$, $NH_4F$ is dissolved in water, the concentration of $NH_4F$ in the aqueous solution is in the range of from about 0.3 to about 2.0 mol/1 $NH_4F$, and the ratio of the number of millimoles of $NH_4F$ to the number of grams of said at least partially separated cracking catalyst composition in step (c) is in the range of from about 0.01:1 to about 10:1.

25. A catalytic cracking process in accordance with claim 18, wherein about 0.01-5 weight percent F has been incorporated into the reactivated catalyst composition obtained in step (c).

26. A catalytic cracking process in accordance with claim 18 comprising the additional step of drying the at least partially separated cracking catalyst composition obtained in step (b), before carrying out step (c).

27. A catalytic cracking process in accordance with claim 18 comprising the additional step of washing the at least partially separated cracking catalyst obtained in step (b) with water at about 100°-212° F. before carrying out step (c).

28. A catalytic cracking process in accordance with claim 18 comprising the additional step of substantially drying said reactivated catalyst composition obtained in step (c).

29. A catalytic cracking process in accordance with claim 18 comprising the additional step of (d) treating the reactivated catalyst composition obtained in step (c) with at least one compound of antimony, under such conditions as to reduce hydrogen generation caused by said at least one metal contaminant during catalytic cracking.

30. A catalytic cracking process in accordance with claim 29, wherein step (d) is carried out under such conditions as to incorporate about 0.1 to about 5 weight-% Sb into the reactivated spent catalyst composition obtained in step (d).

31. A catalytic cracking process in accordance with claim 29 comprising the additional step of substantially drying the reactivated catalyst composition obtained in step (d).

32. A catalytic cracking process in accordance with claim 18, wherein said hydrocarbon-containing feed stream has an initial boiling point, determined in accordance with ASTM method D 1160, of at least 400° F, measured at atmospheric pressure conditions, and an API gravity in the range of from about 5 to about 40.

33. A catalytic cracking process in accordance with claim 18, wherein said hydrocarbon-containing feed stream contains about 0.1-20 weight-% Ramsbottom carbon residue, about 0.1-5 weight-% sulfur, about 0.05.2 weight-% nitrogen, about 0.05-30 ppm nickel, about 0.1-50 ppm vanadium and about 0.01-30 ppm copper.

34. A catalytic cracking process in accordance with claim 18, wherein said hydrocarbon containing feed stream is selected from the group consisting of heavy gas oils and hydrotreated residua.

* * * * *

UNITED STATES PATENT AND TRADEMARK OFFICE
CERTIFICATE OF CORRECTION

PATENT NO. : 4,929,336

DATED : May 29, 1990

INVENTOR(S) : Richard E. Lowery; Chia Min Fu; Michael K. Maholland

It is certified that error appears in the above-identified patent and that said Letters Patent is hereby corrected as shown below:

Title page, Item [75] Inventors, delete "M." after "Chia" and substitute --- Min --- therefor.

Claim 4, column 9, line 26, delete "siep" and substitute --- step --- therefor.

Claim 10, column 9, line 59, delete "°14" after "100" and substitute --- - --- therefor.

Signed and Sealed this

Twenty-seventh Day of August, 1991

Attest:

HARRY F. MANBECK, JR.

*Attesting Officer*      *Commissioner of Patents and Trademarks*